(12) United States Patent
Hiraga et al.

(10) Patent No.: US 7,801,443 B2
(45) Date of Patent: Sep. 21, 2010

(54) AUTOMATIC CIRCULATION COLLECTION TYPE DATA COLLECTING SYSTEM

(75) Inventors: Takashi Hiraga, Osaka (JP); Ichiro Ueno, Osaka (JP); Noritaka Yamamoto, Osaka (JP); Toshiko Mizokuro, Osaka (JP); Nobutaka Tanigaki, Osaka (JP); Norio Tanaka, Tokyo (JP); Kuniaki Aoki, Shizuoka (JP); Hirofumi Watanabe, Kanagawa (JP); Shiro Futaki, Kanagawa (JP)

(73) Assignees: National Institute of Advanced Industrial Science and Technology, Tokyo (JP); Dainichiseika Color & Chemicals Mgf. Co., Ltd., Tokyo (JP); Spacecreation Co., Ltd., Shizuoka (JP); Inter Energy Co., Ltd., Kanagawa (JP)

( * ) Notice: Subject to any disclaimer, the term of this patent is extended or adjusted under 35 U.S.C. 154(b) by 579 days.

(21) Appl. No.: 11/878,448

(22) Filed: Jul. 24, 2007

(65) Prior Publication Data

US 2008/0075458 A1 Mar. 27, 2008

(30) Foreign Application Priority Data

Jul. 25, 2006 (JP) ............................. 2006-202633

(51) Int. Cl.
*H04B 10/08* (2006.01)
(52) U.S. Cl. ............................. 398/9; 398/33; 398/177; 398/59; 398/45
(58) Field of Classification Search ...................... 398/9, 398/30, 31, 33, 177, 37, 38, 181, 104, 105, 398/107, 108, 109, 110, 111, 112, 113, 141, 398/58, 59, 174, 175, 173, 176
See application file for complete search history.

(56) References Cited

U.S. PATENT DOCUMENTS 7,103,275 B2 * 9/2006 Fujiwara ....................... 398/31
7,437,070 B2 * 10/2008 Fujieda et al. ................ 398/31

\* cited by examiner

*Primary Examiner*—Hanh Phan
(74) *Attorney, Agent, or Firm*—Wenderoth, Lind & Ponack, L.L.P.

(57) ABSTRACT

An automatic circulation collection type data system is constructed by connecting a monitoring device and data collecting modules disposed at respective places through optical cables. The monitoring device transmits a trigger pulse for data collection through the optical cable to each data collecting module. An identification code is given to each data collecting module, and each data collecting module has an automatic circulation mechanism comprising first and second optical switches, a data collecting unit, and a controller 6 for performing various kinds of control for data collection. When receiving the trigger pulse from the monitoring device, the automatic circulation mechanism turns on the third switch and transmits the collected data through the optical cable to the monitoring device together with the identification code, and also transmits a trigger pulse through the optical cable to a next data collecting module.

3 Claims, 3 Drawing Sheets

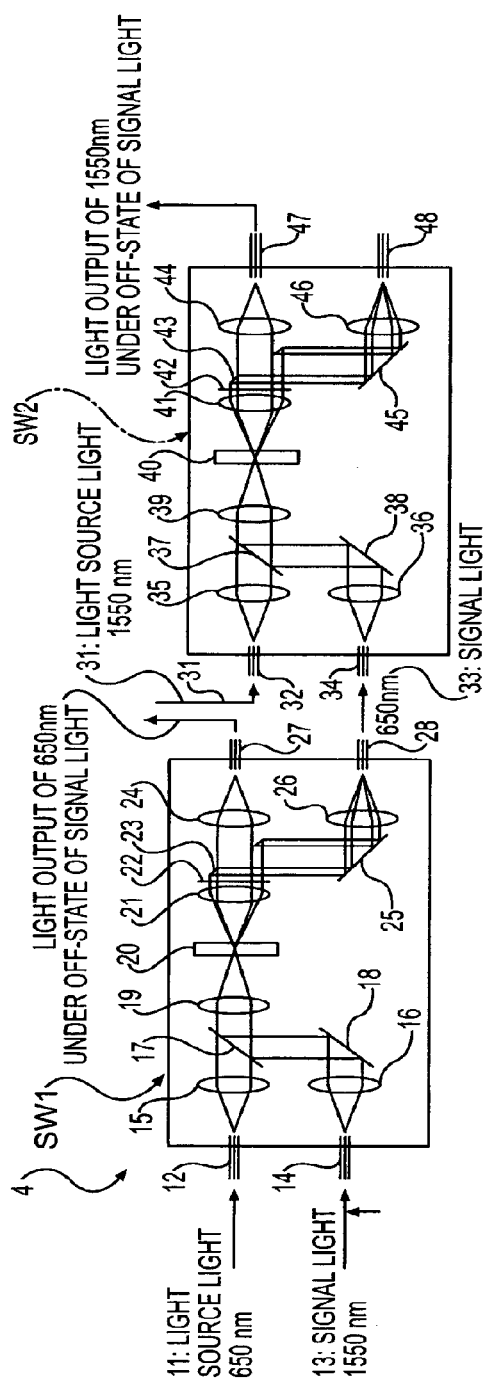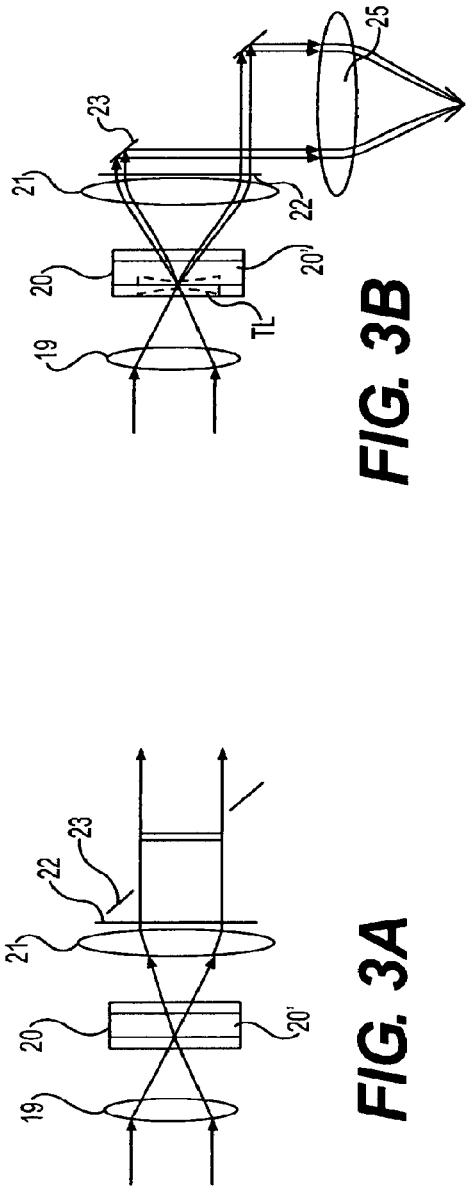

AUTOMATIC CIRCULATION COLLECTION TYPE DATA COLLECTING SYSTEM

TECHNICAL FIELD

The present invention relates to an automatic circulation collection type data collecting system constructed by using an optical switch based on a new principle.

BACKGROUND ART

When the condition of a river or the like is monitored, it has been frequently performed to dispose a monitor camera or a sensor at each place under surveillance, collect data from these places by a monitoring center and monitor these data to perform the surveillance of the river or the like, for example. In this case, it is general that the collected data are withdrawn as electrical signals and converted to image signals or the like.

However, there has been a problem that it is impossible to continue the surveillance when an electric cable is cut or power supply is cut off under such a bad weather as a typhoon or the like.

SUMMARY OF THE INVENTION

The present invention has been implemented in view of the foregoing situation, and it is an object of the present invention to provide an automatic circulation collection type data collecting system that can continue surveillance even when an electric cable is cut or power supply is cut off, and also can be constructed by an inexpensive construction.

According to the present invention, in order to solve the above problem, first, there is provided an automatic circulation collection type data collecting system constructed by connecting a monitor device and a data collecting module disposed at each place through an optical cable, wherein; the monitor device comprises a trigger pulse generator for transmitting a data-collecting trigger pulse through an optical cable to each data collecting module at a predetermined timing, a collected data withdrawing unit for receiving collected data from each data collecting module through an optical cable, and a controller for transmitting a control signal for data collection to each data collecting module; each data collecting module is provided with an identification code, each data collecting module has an automatic circulation mechanism comprising a first optical switch and a second optical switch, a data collecting unit for collecting data at each place, a controller connected to the data collecting unit and the optical cable, and a third optical switch for controlling on/off of the connection between the controller and the optical cable; each of the first optical switch and the second optical switch comprises such an optical control type optical switch as to receive light source light and signal light having a wavelength different from that of the light source light and controlling on/off of the output of the light source by on/off of the input of the signal light; and when receiving a trigger pulse from the monitor device, the automatic circulation mechanism turns on the third switch and makes the controller transmit data collected by a data collecting unit to the monitor device through the optical cable together with the identification code, and also transmits a trigger pulse through the optical cable to a next data collecting module.

Secondary, in the above first invention, there is provided the automatic circulation collection type data collecting system, wherein the first optical switch comprises: a first signal input unit for receiving first light source light as continuous light having a first wavelength $\lambda 1$ and first signal light as pulsed light having a second wavelength $\lambda 2$ coaxially while the first light source light and the first signal light are converged; a first thermal lens effect element that has a first light absorption layer having a wavelength band that has absorption performance to second signal light and transmission performance to the first light source light, uses a thermal lens based on a refractive index distribution reversibly occurs due to temperature increase in an area where the first signal light is absorbed by the first light absorption layer and the surrounding area thereof, and implements, in accordance with irradiation or non-irradiation of the first signal light, a state that the first light source light is outputted at a normal open angle when the first signal light is not irradiated and thus the thermal lens is not formed, and a state that the first light source light is outputted at an open angle larger than the normal open angle when the first signal light is irradiated and thus the thermal lens is formed, and a first light source light selecting unit for outputting from a first output port the first light source light output at the normal open angle out of the first light source light outputted from the first thermal lens effect element, and outputting from a second output port the first light source light output at the open angle larger than the normal open angle; wherein the second optical switch comprises; a second signal input unit for taking a first light source light having a first wavelength $\lambda 1$ outputted from the second output port of the first optical switch as second signal light, and receiving the second signal light and second light source light as continuous light having a second wavelength $\lambda 2$ coaxially while converging the second signal light and the second light source light, a second thermal lens effect element that has a second light absorption layer having a wavelength band having absorption performance to the second signal light and transmission performance to the second light source light, uses a thermal lens based on a refractive index distribution reversibly occurs due to temperature increase in an area where the second signal light is absorbed by the second light absorption layer and the surrounding area thereof, and implements, in accordance with irradiation or non-irradiation of the second signal light, a state that the second light source light is outputted at a normal open angle when the second signal light is not irradiated and thus the thermal lens is not formed, and a state that the second light source light is outputted at an open angle larger than the normal open angle when the second signal light is irradiated and thus the thermal lens is formed, and a second light source light selecting unit for outputting from a first output port the second light source light output at the normal open angle out of the second light source light outputted from the second thermal lens effect element, and outputting from a second output port the second light source light output at the open angle larger than the normal open angle, and wherein the first signal input unit of the first optical switch is connected to the optical cable, and takes a trigger pulse as first signal light, the first output port of the first optical switch is connected to the third optical switch, the second output port of the first optical switch is connected to the second signal input unit of the second optical switch, and the second output port of the second optical switch is connected to the optical cable.

Thirdly, in the second invention, there is provided the automatic circulation collection type data collecting system according to claim 2, wherein each of the first light source light selecting unit and the second light source light selecting unit comprises a hole-formed mirror, and transmits the first light source light and the second light source light through the hole thereof when each of the first light source light and the second light source light has a normal open angle, and changes the direction of the optical paths of the first light source light and the second light source light by a mirror portion of the hole-formed mirror when the first light source light and the second light source light have an open angle larger than the normal open angle.

According to the present invention, there can be provided an automatic circulation collection type data collecting system that can continuously perform surveillance even when an electric cable is cut or power supply is cut off, and perform withdrawal of collected data with an inexpensive construction based on a new principle using an optical technology without executing electrical processing.

BRIEF DESCRIPTION OF THE DRAWINGS

FIG. 2 is a schematic diagram showing the construction of the automatic circulation mechanism used in a data collecting module according to the embodiment.

FIG. 3 is a diagram showing a thermal lens effect element.

BEST MODE FOR CARRYING OUT THE INVENTION

An embodiment of the present invention will be described.

Figure 1:
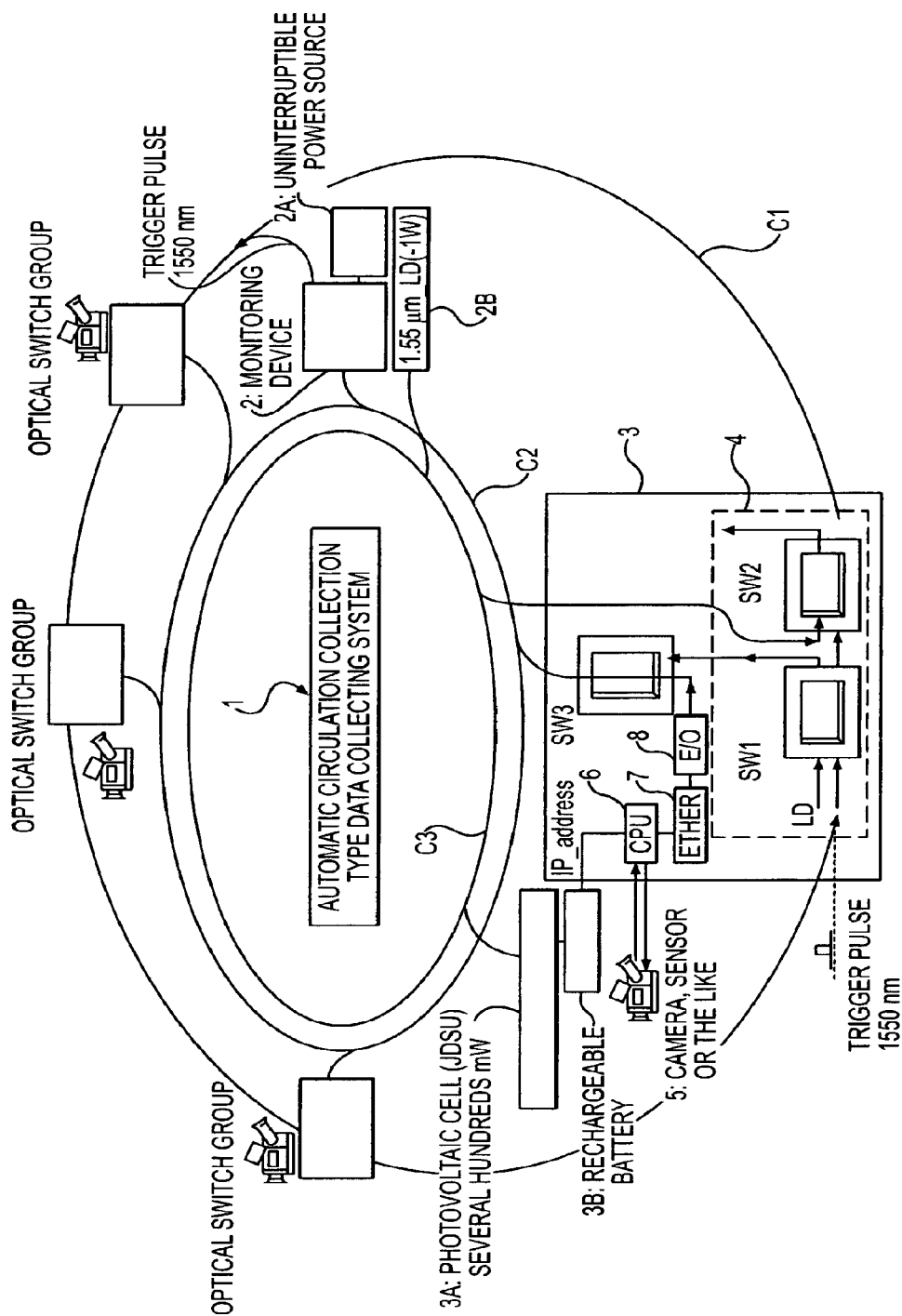
FIG. 1 is a schematic diagram showing the construction of an automatic circulation collection type data collecting system according to an embodiment of the present invention.

FIG. 1 is a schematic diagram showing the construction of an automatic circulation collection type data collecting system 1 according to an embodiment of the present invention.

In the automatic circulation collection type data collecting system 1, a monitoring device 2 and plural data collecting modules 3 disposed at respective places are connected to one another through optical cables C1, C2, C3, etc. in a circulation style. Only one data collecting module 3 is shown in detail in FIG. 1 for convenience's sake. The monitor device 2 may be disposed at the monitor center which is isolated from the respective data collecting modules 3, for example. In this embodiment, the monitor device 2 has an uninterruptible power source 2A. It also has a laser oscillating device 2B for power supply or the like, and it supplies power to each data collecting module 3 through the optical cable C3. As not shown, the monitor device 2 has a trigger pulse generator for transmitting a trigger pulse for collecting data at a predetermined timing through the optical cable C1 to each data collecting module 3, a collected data withdrawing unit for receiving collected data from each data collecting module 3 through the optical cable C2, a controller for transmitting a control signal for data collection to each data collecting module 3, a monitor device for monitoring, etc.

An identification code is given to each data collecting module 3, and each data collecting module 3 is equipped with an automatic circulation mechanism 4 comprising a first optical switch SW1 and a second optical switch SW2, a data collecting unit 5 for collecting data at each place, a controller (CPU) 6 that is connected to the data collecting unit 5 and the optical cable C2 and carries out various control for data collection, a communication controller (Ether) 7, an E/O unit 8 for performing mutual conversion between an electrical signal and an optical signal, and a third optical switch SW3 for controlling on/off of the connection between the controller 6 side and the optical cable C2 side. A photovoltaic cell 3A and a rechargeable battery 3B which are connected to the optical cable C3 are provided. A monitor camera, various kinds of sensors or the like may be used as the data collecting unit 5 in accordance with the intended use or application.

A well-known "IP address" which is broadly used in digital information transmission may be suitably used as the identification code given to each data collecting module together with the data identification system using the IP Address. It can be surely grasped on the basis of the identification code which data collecting module transmits the data concerned.

Each of the optical switch SW1 and the second optical switch SW2 of the automatic circulation mechanism 4 comprises such an optical control type optical switch as to receive light source light and signal light different in wavelength from the light source light and control on/off of the output of the signal light on the basis of on/off of the input of the signal light. A normal on/off-control type optical switch may be used as the third optical switch SW3.

When receiving a trigger pulse from the monitor device 2 through the cable C1, the automatic circulation mechanism 4 turns on the third switch SW3, and it makes the controller 6 transmit the data collected by the data collecting unit 5 through the optical cable to the monitor device 2 for a predetermined time, and also transmits a trigger pulse through the optical cable C1 to a next data collecting module 3.

Hereinafter, the construction of the automatic circulation mechanism 4 of the data collecting unit 3 will be described in detail.

As described above, the automatic circulation mechanism 4 is constructed by the first optical switch SW1 and the second optical switch SW2. The first optical switch SW1 is provided with an input port 12 for taking light source light 11 as continuous (CW) light of 650 in wavelength and an input port 14 for taking pulsed signal light "gate light" of 1550 nm in wavelength as a trigger pulse. A lens 15 for collimating the input light source light 11 is disposed as the downstream side of the input port 12, and a lens 16 for collimating the input signal light 13 is disposed at the downstream side of the input port 14. A dichroic mirror 17 is disposed at the downstream side of the lens 15, and a mirror 18 for changing the optical path of the collimated light from the lens 16 is disposed at the downstream side of the lens 16. The dichroic mirror 17 transmits the collimated light from the lens 15 therethrough, but changes the optical path of the collimated light from the mirror 18 so that the light source light 11 and the signal light 13 are set to coaxially overlapped collimated light. A lens 19, a thermal lens effect element 20, a lens 21, a filter 22, a hole-formed mirror 23 and a lens 24 are disposed at the downstream side of the dichroic mirror 17. The lens 19 converges the overlapped collimated light from the dichroic mirror 17 so that the focal point thereof is within the thermal lens effect element 20. When only the light source light 11 is inputted to the thermal lens effect element 20, the thermal lens effect element 20 outputs the light source light 11 at a normal open angle. When both the light source light 11 and the signal light 13 are inputted at the same time, it forms a thermal lens and output both the lights 11, 13 at an open angle larger than the normal open angle. The lens 21 collimates both the output light 11, 13. The filter 22 cuts the signal light 13, and transmits the light source light 11 therethrough. The hole-formed mirror 23 transmits the light source light 11 of the normal opening angle through the hole thereof, and reflects the light source light 11 of the open angle larger than the normal open angle from the mirror portion to change the optical path of the light source light 11 concerned. The mirror 24 at the downstream side of the hole-formed mirror 23 converges the light source light 11 transmitted through the hole of the hole-formed mirror 23. A mirror 25 for further reflecting the light source light 11 reflected from the hole-formed mirror 23 to change the optical path thereof is disposed below the hole-formed mirror 23, and a lens 26 for converting the collimated light from the mirror 25 is disposed at the downstream side of the mirror 25. The first optical switch SW1 is provided with two output ports 27, 28. The output port 27 outputs light of 650 nm converged by the lens 24 under the off-state of the signal light 13, and supplies the light to third optical switch SW3. Under this state, the third optical switch SW3 sets the connection between the controller 6 and the optical cable C2 to OFF. The output port 28 outputs of light of 650 nm converged by the lens 26 under the on-state of the signal light 13. Under this state, the third optical switch SW3 sets the connection between the controller 6 and the cable C2 to ON, so that collected data are transmitted. The on-state is continued for a predetermined time.

The second optical switch SW2 is provided with an input port 32 for taking light source light 31 as continuous (CW) light of 1550 nm in wavelength which is supplied from the laser oscillator 2B of the monitor device 2 through the optical cable C3, and an input port 34 for taking light of 650 nm output from the output port 28 of the first optical switch SW1 as signal light "gate light" 33. A lens 35 for collimating the input light source light 31 is disposed at the downstream side of the input port 32, and a lens 36 for collimating the input signal light 33 is disposed at the downstream side of the input port 34. A dichroic mirror 37 is disposed at the downstream side of the lens 35, and a mirror 38 for changing the optical path of the collimated light from the lens 36 is disposed at the downstream side of the lens 36. The dichroic mirror 37 transmits the collimated light from the lens 35 therethrough and changes the optical path of the collimated light from the mirror 38 so that the light source light 31 and the signal light 33 are set to coaxially overlapped collimated light. A lens 39, a thermal lens effect element 40, a lens 41, a filter 42, a hole-formed mirror 43 and a lens 44 art disposed at the downstream side of the dichroic mirror 37. The lens 39 converges the overlapped collimated light from the dichroic mirror 37 so that the focal point thereof is within the thermal lens effect element 40. When only the light source light 31 is inputted, the thermal lens effect element 40 outputs the light source light 31 at a normal open angle, and when both the light source light 31 and the signal light 33 are inputted at the same time, the thermal lens effect element 40 forms a thermal lens and outputs both the light 31, 33 at an open angle larger than the normal open angle. The lens 41 collimates both the light 31, 33. The filter 42 cuts the signal light 33 and transmits the light source light 31 therethrough. The hole-formed mirror 43 transmits the light source light 31 of the normal open angle through the hole thereof, and reflects the light source light 31 of the open angle larger than the normal open angle from the mirror portion to change the optical path thereof. The lens 44 at the downstream side of the hole-formed mirror 43 converges the light source light 31 transmitted through the hole of the hole-formed mirror 43. A mirror 45 for further reflecting the light source light 31 reflected from the hole-formed mirror 43 to change the optical path is disposed below the hole-formed mirror 43. A lens 46 for converging the collimated light from the mirror 45 is disposed at the downstream side of the mirror 45. The second optical switch SW2 is provided with two output ports 47, 48. The output port 47 outputs light of 1550 nm converged by the lens 44 under the off-state of the signal light 33. The output port 48 outputs light of 1550 nm converged by the lens 46 under the on-state of the signal light 33. The light output from the output port 48 is transmitted as a trigger pulse to the optical cable C1, and transmitted to a next data collecting unit 3.

The pulse width of the trigger pulse is set to about several hundreds µs to 1 ms, and the pulse height is set to several mW to 10 mW, however, they are not limited to these values.

Next, the thermal lens effect element 20 of the first optical switch SW1 and the thermal lens effect element 40 of the second optical switch SW2 will be described.

FIG. 3 is a conceptual diagram showing the thermal lens effect element 20. The thermal lens effect element 20 is equipped with a light absorption layer 20' formed of dye having a wavelength band which has transmission performance to the light source light 11 of 650 nm in wavelength and absorption performance to the signal light 13 of 1550 nm in wavelength. A commercially available infrared absorption dye may be suitably used as the dye having the wavelength band as described above. More specifically, CIR-960 produced by Japan Carlit Co., Ltd. may be used, for example.

The thermal lens effect element 20 has the following reversible refractive index variation. That is, when the signal light 13 of 1550 nm in wavelength is irradiated to the light absorption layer 20' having the wavelength band as described above, the temperature of an area in which the light is absorbed and the surrounding area thereof is increased, and the refractive index of these areas varies. That is, the refractive index varies in accordance with the temperature distribution and thus a thermal lens (TL) is formed. When the irradiation of the signal light 13 is finished, it is returned to the original state. Accordingly, when only the light source light 11 as the continuous (CW) light is irradiated to the thermal lens effect element 20 and the signal light 13 is set to the off-state, no thermal lens (TL) is formed as shown in FIG. 3(a). Therefore, the light source light 11 is outputted as a normal open angle, collimated by the lens 21, and directly transmitted through the hole of the hole-formed mirror 22 as a light beam having a circular cross-section. On the other hand, when the light source light 11 is irradiated to the thermal lens effect element 20 and the signal light 13 is set to the on-state, the thermal lens (TL) is formed as shown in FIG. 3(b), and the light source light 11 is outputted as an angle larger than the normal open angle, collimated by the lens 21, and reflected from the mirror portion of the hole-formed mirror 22 as a light beam having a ring-shaped cross-section to change the direction of the optical path.

Figure 4:
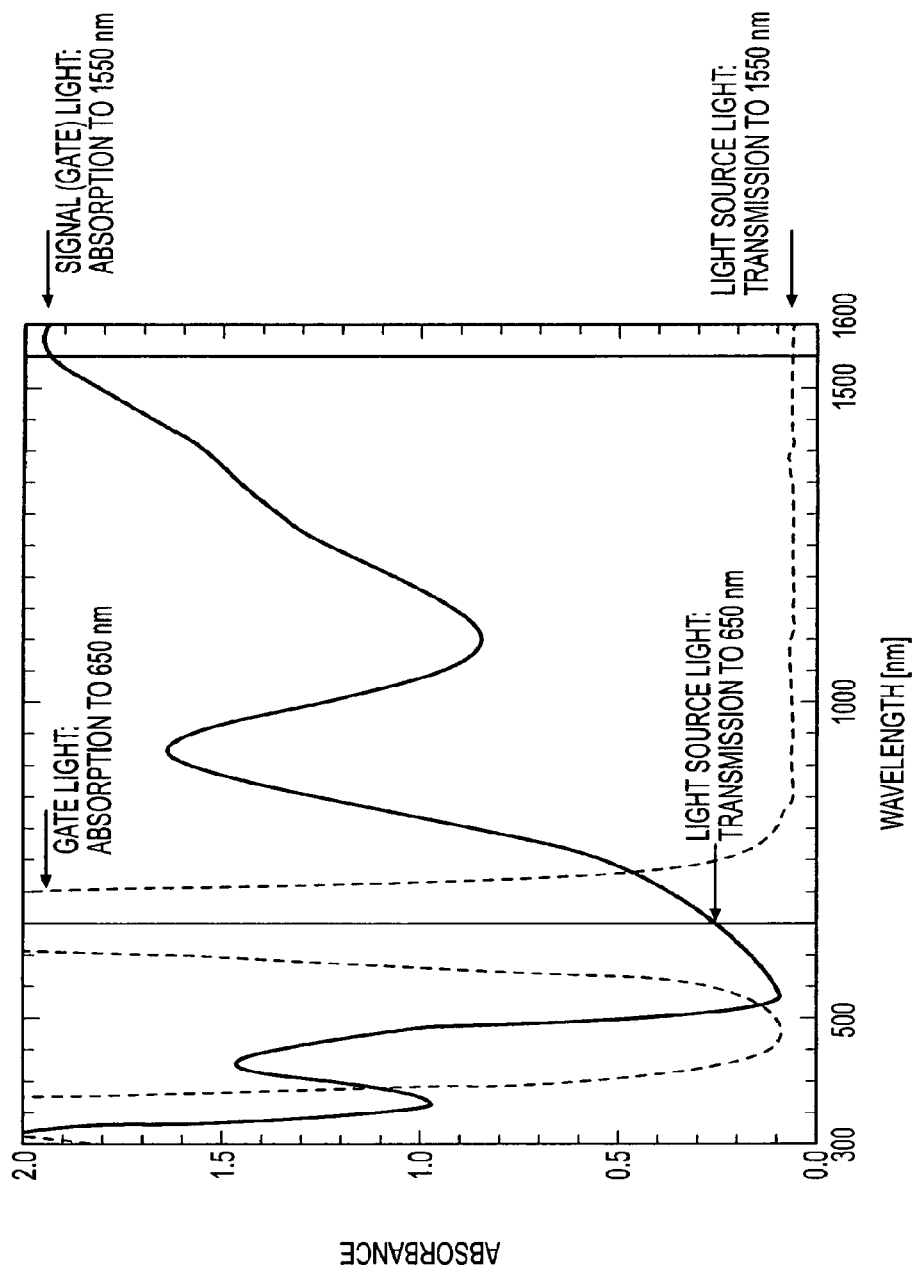
FIG. 4 is a diagram showing the wavelength characteristic of light absorption film used in the thermal lens effect element.

As indicated by a chain line of FIG. 4, the thermal lens effect element 40 is equipped with a light absorption layer formed of dye having a wavelength band which has transmission performance to the light source light 31 of 1550 nm in wavelength and absorption performance to the signal light 33 of 650 nm in wavelength. A solvent soluble phthalocyanine dye may be suitably used as the dye having the wavelength band as described above. More specifically, for example, copper (II) 2,9,16,23-tetra-tert-butyl-29H,31H-phthalocyanine may be used. The formation and action of the thermal lens are the same as described above.

The thermal lens effect elements 20, 40 basically have the absorption and transmission wavelength characteristics as described above, and it would be sufficient only if they have the light absorption layers 20', 40' which can form the thermal lens, and various layers disclosed in JP-A-2005-265986 associated with an application of the inventors of this application, such as a layer for promoting light absorption, a heat transfer layer, a heat-retaining layer, may be provided.

In this embodiment, the trigger pulse is made to circulate through the optical cable C3 as described above.

Furthermore, in the automatic circulation mechanism 4, the hole-formed mirror is used as a light source light selecting unit. However, the present invention is not limited to this embodiment, and any suitable element such as a member having a hole portion formed of a transparent material, an element which transmits only a specific wavelength, etc. may be used insofar as it can select the light source light. Furthermore, any suitable values or any suitable combination may be set as the wavelengths of light used as the light source light and the signal light.

In this embodiment, as described above, the collected data can be withdrawn without any electrical processing by using the automatic circulation mechanism using novel optical switches and the optical cables. Therefore, the system can be architected in low cost and also a monitor target can be continuously monitored even when an electric cable is cut or power supply is cut off under a bad weather or the like.

The invention claimed is:

1. An automatic circulation collection type data collecting system constructed by connecting a monitor device and a data collecting module disposed at each place through an optical cable, wherein;

the monitor device comprises a trigger pulse generator for transmitting a data-collecting trigger pulse through an optical cable to each data collecting module at a predetermined timing, a collected data withdrawing unit for receiving collected data from each data collecting module through an optical cable, and a controller for transmitting a control signal for data collection to each data collecting module;

each data collecting module is provided with an identification code, each data collecting module has an automatic circulation mechanism comprising a first optical switch and a second optical switch, a data collecting unit for collecting data at each place, a controller connected to the data collecting unit and the optical cable, and a third optical switch for controlling on/off of the connection between the controller and the optical cable;

each of the first optical switch and the second optical switch comprises such an optical control type optical switch as to receive light source light and signal light having a wavelength different from that of the light source light and controlling on/off of the output of the light source by on/off of the input of the signal light; and when receiving a trigger pulse from the monitor device, the automatic circulation mechanism turns on the third switch and makes the controller transmit data collected by a data collecting unit to the monitor device through the optical cable together with the identification code, and also transmits a trigger pulse through the optical cable to a next data collecting module.

2. The automatic circulation collection type data collecting system according to claim 1, wherein the first optical switch comprises:

a first signal input unit for receiving first light source light as continuous light having a first wavelength $\lambda 1$ and first signal light as pulsed light having a second wavelength $\lambda 2$ coaxially while the first light source light and the first signal light are converged;

a first thermal lens effect element that has a first light absorption layer having a wavelength band that has absorption performance to second signal light and transmission performance to the first light source light, uses a thermal lens based on a refractive index distribution reversibly occurs due to temperature increase in an area where the first signal light is absorbed by the first light absorption layer and the surrounding area thereof, and implements, in accordance with irradiation or non-irradiation of the first signal light, a state that the first light source light is outputted at a normal open angle when the first signal light is not irradiated and thus the thermal lens is not formed, and a state that the first light source light is outputted at an open angle larger than the normal open angle when the first signal light is irradiated and thus the thermal lens is formed, and a first light source light selecting unit for outputting from a first output port the first light source light output at the normal open angle out of the first light source light outputted from the first thermal lens effect element, and outputting from a second output port the first light source light output at the open angle larger than the normal open angle;

wherein the second optical switch comprises;

a second signal input unit for taking a first light source light having a first wavelength $\lambda 1$ outputted from the second output port of the first optical switch as second signal light, and receiving the second signal light and second light source light as continuous light having a second wavelength $\lambda 2$ coaxially while converging the second signal light and the second light source light, a second thermal lens effect element that has a second light absorption layer having a wavelength band having absorption performance to the second signal light and transmission performance to the second light source light, uses a thermal lens based on a refractive index distribution reversibly occurs due to temperature increase in an area where the second signal light is absorbed by the second light absorption layer and the surrounding area thereof, and implements, in accordance with irradiation or non-irradiation of the second signal light, a state that the second light source light is outputted at a normal open angle when the second signal light is not irradiated and thus the thermal lens is not formed, and a state that the second light source light is outputted at an open angle larger than the normal open angle when the second signal light is irradiated and thus the thermal lens is formed, and a second light source light selecting unit for outputting from a first output port the second light source light output at the normal open angle out of the second light source light outputted from the second thermal lens effect element, and outputting from a second output port the second light source light output at the open angle larger than the normal open angle, and wherein the first signal input unit of the first optical switch is connected to the optical cable, and takes a trigger pulse as first signal light, the first output port of the first optical switch is connected to the third optical switch, the second output port of the first optical switch is connected to the second signal input unit of the second optical switch, and the second output port of the second optical switch is connected to the optical cable.

3. The automatic circulation collection type data collecting system according to claim 2, wherein each of the first light source light selecting unit and the second light source light selecting unit comprises a hole-formed mirror, and transmits the first light source light and the second light source light through the hole thereof when each of the first light source light and the second light source light has a normal open angle, and changes the direction of the optical paths of the first light source light and the second light source light by a mirror portion of the hole-formed mirror when the first light source light and the second light source light have an open angle larger than the normal open angle.

* * * * *

UNITED STATES PATENT AND TRADEMARK OFFICE
CERTIFICATE OF CORRECTION

| | | |
|---|---|---|
| PATENT NO. | : 7,801,443 B2 | Page 1 of 1 |
| APPLICATION NO. | : 11/878448 | |
| DATED | : September 21, 2010 | |
| INVENTOR(S) | : Takashi Hiraga et al. | |

It is certified that error appears in the above-identified patent and that said Letters Patent is hereby corrected as shown below:

On the Title Page

In Section (73), Assignees, line 4, please change "Mgf." to --Mfg.--.

Signed and Sealed this
Fifteenth Day of February, 2011

David J. Kappos
*Director of the United States Patent and Trademark Office*